UNITED STATES PATENT OFFICE.

BINY AUGUSTE, OF CHICAGO, ILLINOIS, ASSIGNOR OF ONE-THIRD HIS RIGHT TO BENJAMIN GOTIA, OF SAME PLACE.

IMPROVEMENT IN ARTIFICIAL MARBLE.

Specification forming part of Letters Patent No. 140,668, dated July 8, 1873; application filed May 31, 1873.

*To all whom it may concern:*

Be it known that I, BINY AUGUSTE, of Chicago, in the county of Cook and State of Illinois, have invented a new, useful, and Improved Artificial Marble; and I hereby declare the following to be a full, clear, and exact description thereof, which will enable others skilled in the art to which my invention appertains to make and use the same.

My invention relates to the manufacture of artificial stone, but more especially artificial marble, to be used for interior decorations of buildings and other ornamental uses; and consists in the admixture of the ingredients, in about the proportions and by the process as hereinafter mentioned.

In the manufacture of my said artificial stone, I take of hydraulic lime, crystallized and reduced to a powder, ninety-five parts; either marble dust, eighty parts, or clean sand, from eighty to one hundred parts, having reference to the weight and color of the sand; plaster, baked at double the usual heat for the purpose of giving to it more strength, one hundred parts; litharge, drawn from white lead, fifty parts; pulverized rock alum, fifteen parts; water, fifty parts; and suitable coloring matter, as hereinafter mentioned; all of which is well and thoroughly mixed together in any suitable vessel. At the same time or very soon thereafter I mix, in a separate vessel, of linseed-oil, forty parts; resin, twenty-five parts; paste of Flandres, (Colle de Flandres,) thirty parts; and red litharge, five parts; all of which are then boiled together, and then thoroughly mixed with the ingredients above specified, and the whole made into a plastic mass, which is then tamped into a suitable mold of any desired form or configuration, where it is allowed to remain under strong pressure, by any suitable means, from two to three hours. The material so formed is then removed from the mold and exposed to the air from one to two hours, and is then, for the purpose of hardening the same, placed in an oven made preferably of sheet-iron, and subjected to a heat of from 90° to 100° Fahrenheit for about three hours, when it is removed from the oven and allowed to become thoroughly cooled. The face thereof is then well rubbed with sand, for the purpose of removing all dust and dirt therefrom, and to polish the same, and is then thoroughly burnished with steel burnishing-tools for the purpose of giving a more perfect or marble polish thereto; when it is varnished with a coat of suitable enamel varnish and replaced in the oven, and subjected to a heat of from 350° to 400° Fahrenheit for one hour to set the said enamel upon and in the said material or composition, and for more completely hardening said composition, when, upon being removed from the oven and becoming perfectly cool, it is fit for use.

To the ingredients as above specified, and while the same are being mixed previous to being tamped in the mold, I add the necessary mineral coloring matter according to the shade and color of the marble, granite, or other stone to be imitated, to wit: For blue, about fifteen parts; for black, from fifteen to eighteen parts; for green, twenty parts; for yellow, twelve parts; and red, ten parts. To imitate veins and spots of a color different from the general color, I add a small quantity of the mineral coloring-matter desired at different points or places in the mass, as aforesaid, and work the same therein before the said mass is placed in the mold. It is to the mineral colors mixed with each other, and with the principal ingredients, as aforesaid, that is due the almost perfect imitation of the various shades and colors of marble.

When desired and for the purpose of adding to the appearance of and assisting in hardening said composition, I add from thirty to forty parts of iron or copper filings; but I do not deem or claim it as essential in the manufacture of my said artificial marble, granite, or other stone. In the manufacture of white artificial marble I do not make use of any of the sand as aforesaid, but in lieu thereof use the marble dust.

By the use of the ingredients and under the process, as above specified, in connection with the suitable mineral coloring matter, I can successfully imitate any kind of marble, granite, or other stone; and I do not intend hereby to confine myself to the manufacture of artificial marble only. My said composition can be used in the place of the natural marble, granite, or stone for all interior decorations of buildings, such as mantle-pieces, moldings, pillar-tops, columns, and tablets, and also for statuary, chandeliers, rose-work, pendulums, ornamental letters for signs, and for various other ornamental devices; and my said composition will not only resist the action of frost, but is both fire and water proof.

Having thus described the nature and object of my invention, what I claim as new, and desire to secure by Letters Patent, is—

1. An artificial marble or stone, composed of the ingredients and in about the proportions substantially as specified.

2. In the manufacture of artificial marble or stone, the process substantially as herein specified.

BINY AUGUSTE.

Witnesses:
N. C. GRIDLEY,
F. F. WARNER.